KENNETH A. VAN DYCK
GEORGE J. KOCH
INVENTORS

BY Daniel J. Mayne
Donald H. Stewart
ATTORNEYS

UNITED STATES PATENT OFFICE 2,611,720

MACHINE FOR MOUNTING A FLEXIBLE FILM ON GLASS FOR MAKING LANTERN SLIDES

Kenneth A. Van Dyck and George J. Koch, Rochester, N. Y., assignors to Eastman Kodak Company, Rochester, N. Y., a corporation of New Jersey Application February 10, 1950, Serial No. 143,486

3 Claims. (Cl. 154—1)

This invention relates to a machine for mounting a flexible film on glass for making a lantern slide. One object of our invention is to provide a simple machine through which a flexible film coated with an adhesive may be passed together with a glass plate, for smoothing the film against the glass plate so that the resulting sandwich will be suitable for lantern slide work. Another object of our invention is to provide a simple type of presser roll mechanism which can be used to smoothly iron a film on a glass plate, and which is particularly designed to facilitate assembly and disassembly so that the parts of the machine can be readily cleaned. Other objects will appear from the following specification, the novel features being particularly pointed out in the claims at the end thereof.

Coming now to the drawings wherein like reference characters denote like parts throughout:

In making slides for projection with known types of lantern slide projectors, it is customary to furnish simple cardboard mounts when certain types of film are processed and returned to the customer. Such lantern slides are well adapted for the usual type of projectors utilizing comparatively low power lamps. However, such slides tend to buckle when used with the high-wattage lamp projectors, and a more desirable form of slide which will not warp can readily be made by smoothing a section of film bearing the image on a glass supporting plate and causing it to adhere thereto.

In order to overcome the difficulty of smoothing such a film onto a glass plate, without permitting air bubbles to form between the film and the plate, we have designed a machine, which will now be described, to accomplish this step in making a warp-proof slide.

Figure 1:
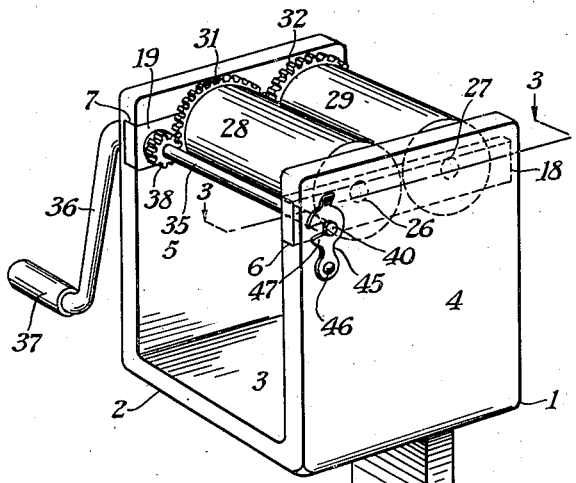
Fig. 1 is a perspective view of an improved form of our machine.
Figure 2:
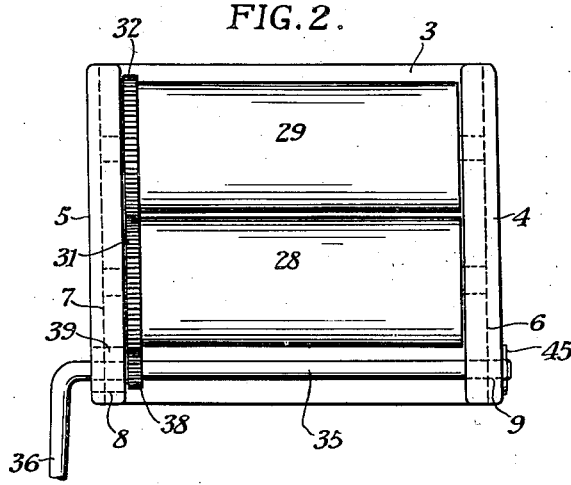
Fig. 2 is a top plan view of the machine shown in Fig. 1.
Figure 5:
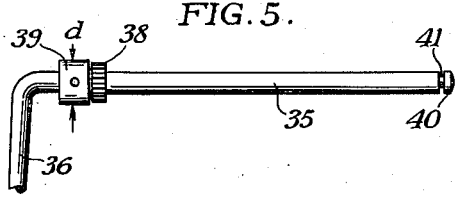
Fig. 5 is a fragmentary side elevation of a portion of a shaft, crank, and pinion drive member removed from the machine.

As indicated in Fig. 1, the machine designated broadly as 1 may include a framework 2 generally U-shaped in cross section and having a bottom wall 3 and side walls 4 and 5. The side walls 4 and 5 include grooves 6 and 7 extending across these walls and, as best shown in Fig. 2, these walls are provided with apertures 8 and 9 extending through the walls 4 and 5 and also through the slots 6 and 7 therein.

If desired, the frame 2 may be attached to an arm 10 formed over at 11 and threaded at 12 to receive a screw 13. This screw is equipped with a handle 14 on one end and a pad 15 on the other end which may be used to support the fixture on a table or other suitable support.

Figure 3:
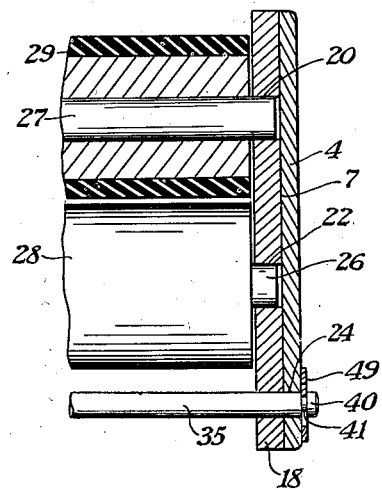
Fig. 3 is an enlarged fragmentary section taken on line 3—3 of Fig. 1.
Figure 4:
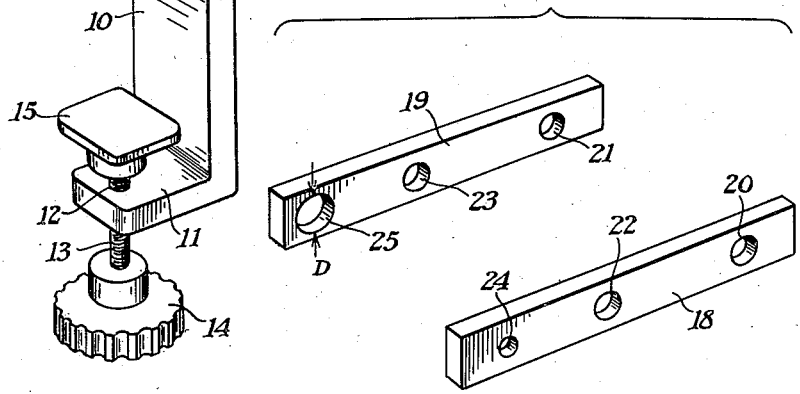
Fig. 4 is a perspective view of the bearing rails used to support the rollers and removed from the assembly of Fig. 1.

The grooves 6 and 7 preferably support a pair of bearing rails 18 and 19, as shown in Fig. 4; these bearing rails having opposite aligned apertures 20 and 21, 22 and 23, and 24 and 25. The apertures 20 to 22 inclusive may all be the same size and they are to receive the ends of shafts supporting wringer rollers. As indicated in Fig. 3, there are two shafts 26 and 27 which are parallel, these shafts supporting resilient rollers 28 and 29. These may be made of a suitable rubber-like material such as elastomer, which is a synthetic product which happens to withstand the adhesive and which can be readily cleaned of the adhesive. However, any suitable material will do. On the ends of the rollers 28 and 29 there are affixed gears 31 and 32 which mesh, as indicated in Fig. 1, when the parts are assembled. The assembly as thus far described is entirely supported by the bearing rails 18 and 19, and in assembling the mechanism, the rollers, gears, and shafts are assembled in the bearing rails 18 and 19 which are then slid as a unit into the slots 6 and 7.

In order to hold the parts in their assembled relationship, there is a shaft 35 provided with a crank arm 36, a handle 37, and a pinion 38. Adjacent the pinion is a sleeve 39 of greater diameter $d$ than the diameter of the pinion 38. The diameter $d$ is somewhat less than the diameter $D$ of the bearing rail 19 so that the sleeve 39 may turn smoothly in this bearing rail while the gear 38 is of a still smaller diameter than that of member 39 and may slide freely through the aperture 25. When the shaft 35 is inserted, the outer end 40 of the shaft, which is preferably provided with a groove 41, is passed through the aligned openings 25 and 24, thus anchoring the bearing rails 18 and 19 in place. The groove 41 on the end of the shaft may be latched by a suitable member, such as a latch 45 pivoted at 46 to the frame 2 and having a hook-shaped member 47 for engaging the groove 41. A less-expensive form of latch is shown in Fig. 3 where a spring washer 49 is merely pushed over the groove 41 to hold the parts in place.

With a machine of this type the steps of assembling a flexible film to a glass plate can be simply carried out, and, while different methods may be used, we prefer the following. The film is first cleaned with alcohol, thus removing any lacquer or dirt from the surface of the film. The film is then attached to the glass plate at one end by means of a Scotch-tape hinge, this glass plate having previously received a gelatin coating. The dust may then be blown off and the film dipped in a gelatin solution, holding the film away from the glass and dipping the film in the solution up to the hinge. The upper end of the film is then held away from the hinge while the hinged end is introduced between the rollers 28 and 29, and, by turning the handle 37, the film is pressed progressively into contact with the glass plate as they pass between the rollers 28 and 29. This not only smooths the gelatin-coated film against the gelatin surface of the glass plate, but it likewise smooths out any air bells, or irregularities, so that good adhesion is readily obtained. The sandwich is then dipped into a cold water bath to set the gelatin, the tape hinge is pulled off, and the lantern slide thus formed can be dried and is then ready for use.

It will be seen from the above description that we have provided a simple form of machine for carrying out the proper registration and attachment of the film to a glass plate. However, since it always happens that the adhesive contacts the rollers 28 and 29 and other parts of the machine, it is necessary to frequently disassemble the device for cleaning. It is even preferable that this cleaning be done each time the machine has been used to make slides. With our improved construction this can be readily done by releasing the latch 47 or 49, withdrawing the shaft 35, thereby releasing the bearing rails 18 and 19, sliding these rails out of their grooves 6 and 7, and disassembling the rails from the rollers, their shafts and their attached gears. Each part may then be cleaned with a suitable solvent, or water, and the machine can readily be reassembled by merely reversing the operations above described.

While we have described a preferred embodiment of our invention, it is obvious that other embodiments will suggest themselves to those skilled in the art. We therefore include as within the scope of our invention any such modifications as may come within the scope of the appended claims.

Having thus described our invention, what we claim is new and desire to secure by Letters Patent of the United States is:

1. A machine for mounting a flexible film upon a relatively rigid support with cement therebetween to produce a lantern slide, said machine comprising a frame having a pair of spaced side walls, each wall having a groove extending transversely of the side wall and in parallel relationship to each other, one wall including an aperture extending through the wall and into the groove, a pair of bearing rails slidable into the pair of grooves in the side walls, one in each groove, a first and a second aperture in each bearing rail forming bearings, a first and second shaft to be supported in the first and second bearing apertures of the bearing rails and to extend only partially therethrough, a third shaft, each bearing plate including a third bearing aperture to support the third shaft, the aperture extending through the side wall and into the groove lying opposite the third aperture in one bearing rail whereby the third shaft may extend therethrough, meshing gears and contacting wringer rolls carried by the first and second shafts, the third shaft carrying a pinion meshing with a gear of the meshing gears carried by the first and second shafts for turning the wringer rolls.

2. The machine for mounting a flexible film upon a relatively rigid support with a cement therebetween to produce a lantern slide as defined in claim 1, characterized in the aperture through one facing wall and extending into the groove and a third aperture in one bearing rail, both being larger than the pinion carried by the third shaft, and a sleeve carried by the third shaft of a size to be rotatably mounted in said large aperture in the bearing rail.

3. The machine for mounting a flexible film upon a relatively rigid support with a cement therebetween to produce a lantern slide as defined in claim 1, characterized in the aperture through one facing wall and the third aperture in one bearing roll, both being larger than the pinion carried by the third shaft, and a sleeve carried by the third shaft being of a size to be rotatably mounted in the large third aperture in the bearing rail, and means for holding and releasing the third shaft for axial movement relative to the aperture.

KENNETH A. VAN DYCK.
GEORGE J. KOCH.

REFERENCES CITED

The following references are of record in the file of this patent:

UNITED STATES PATENTS

| Number | Name | Date |
|---|---|---|
| 56,591 | McMillen | July 24, 1866 |
| 2,302,566 | Minkow | Nov. 17, 1942 |